Figure 7:
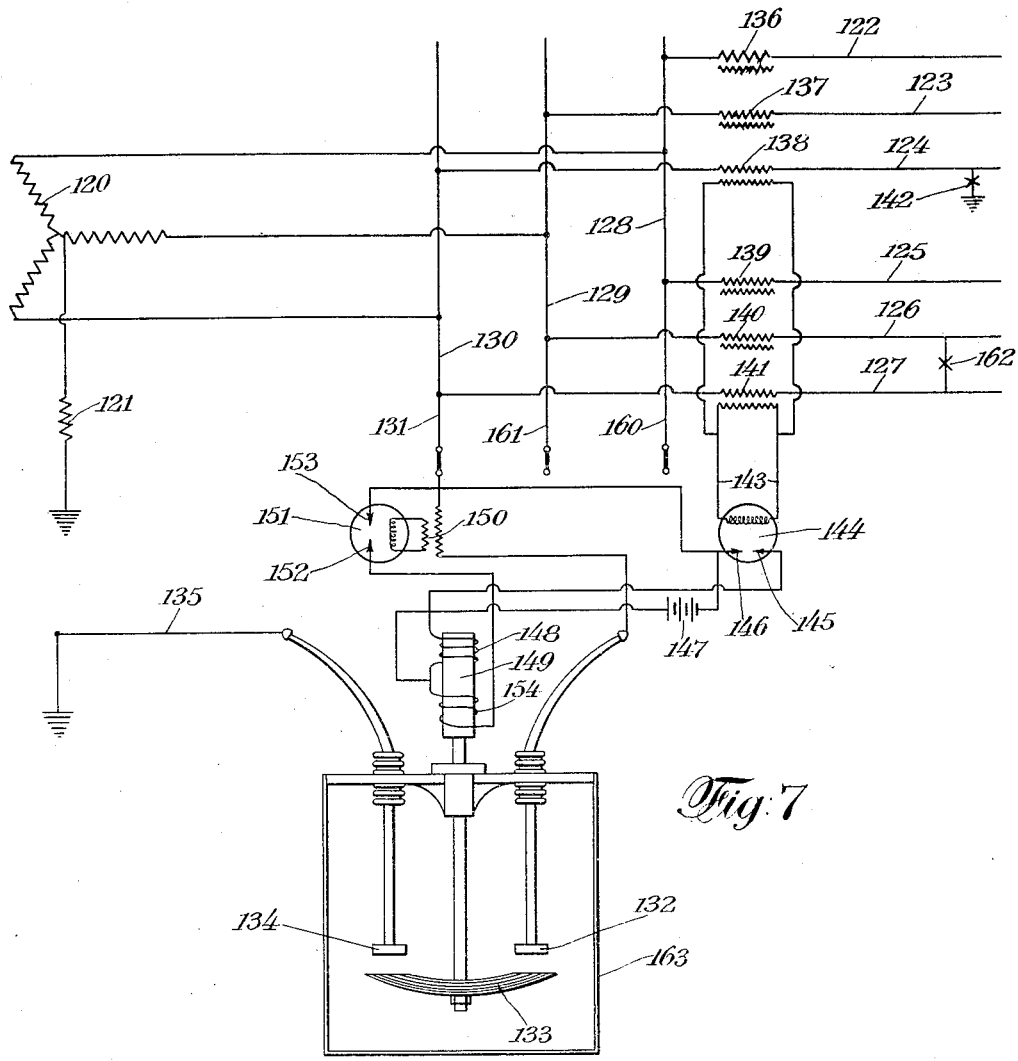

L. C. NICHOLSON.
PROTECTIVE SYSTEM FOR ELECTRICAL TRANSMISSION LINES.
APPLICATION FILED MAR. 29, 1911.
1,236,595.
Patented Aug. 14, 1917.
6 SHEETS—SHEET 1.
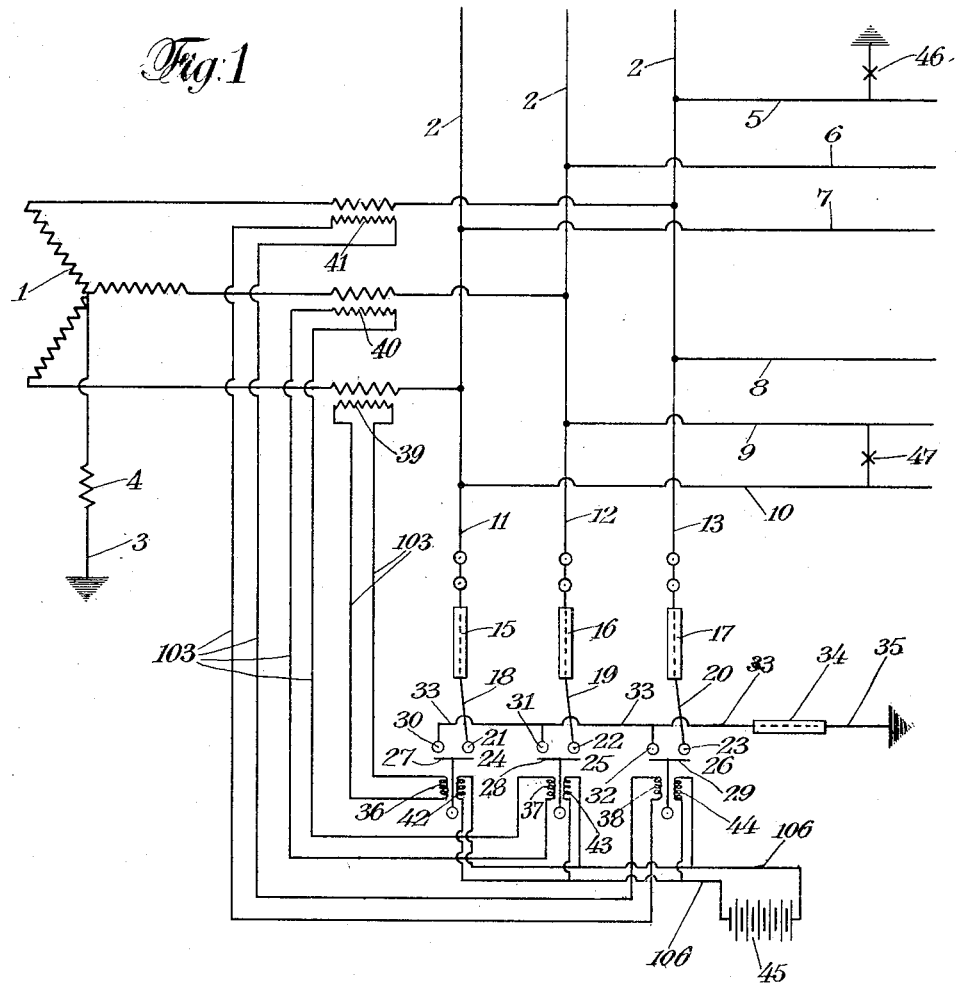

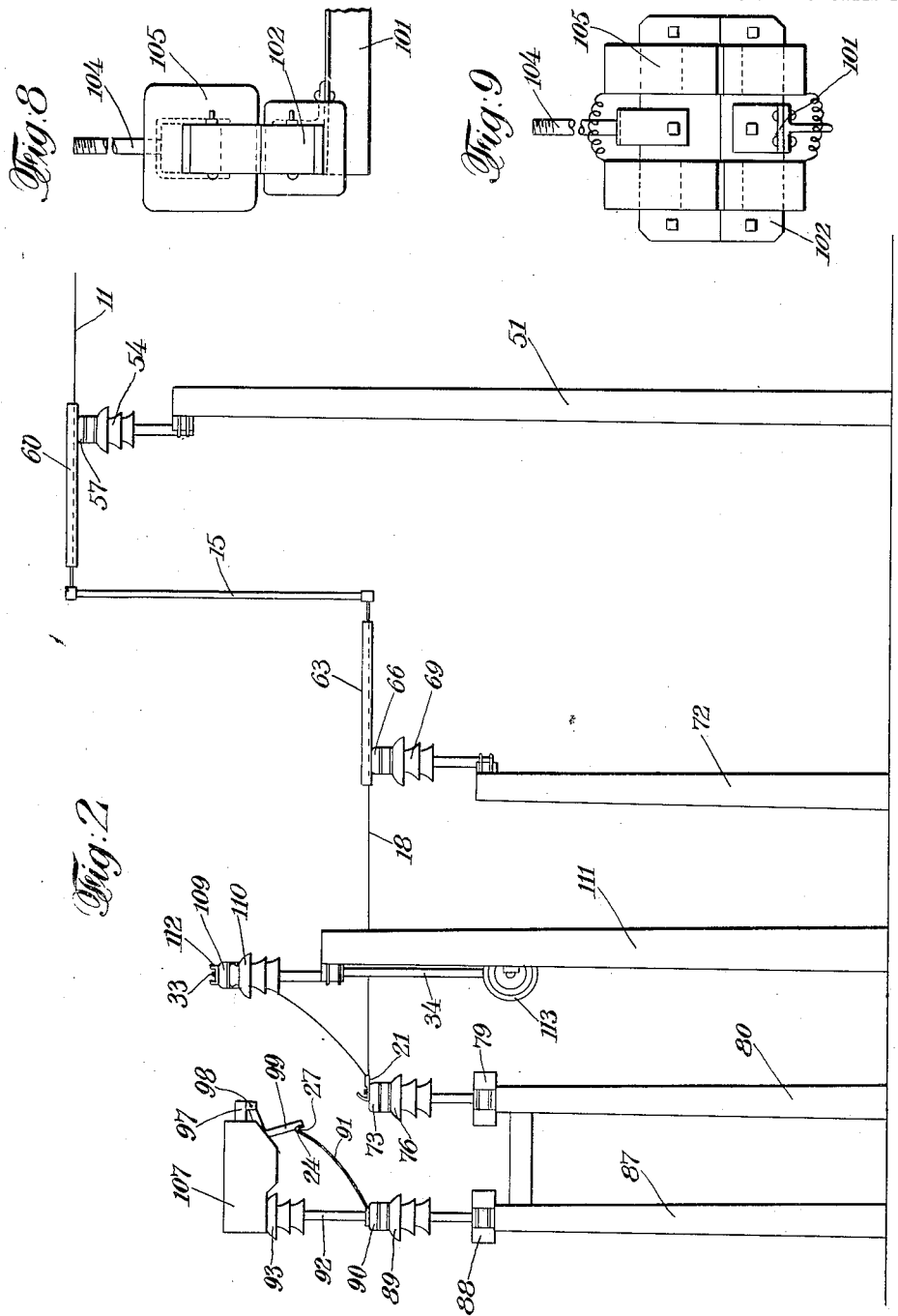

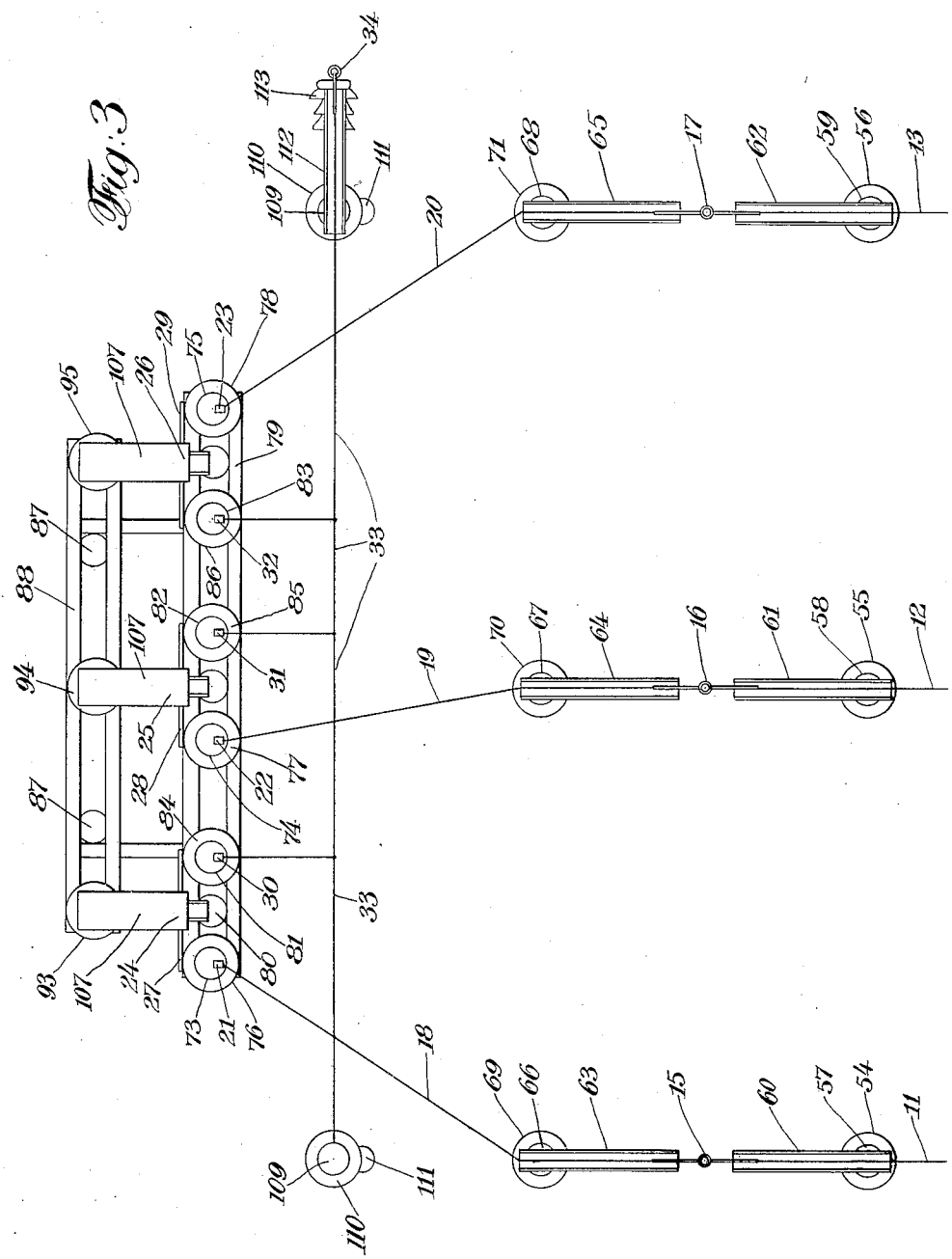

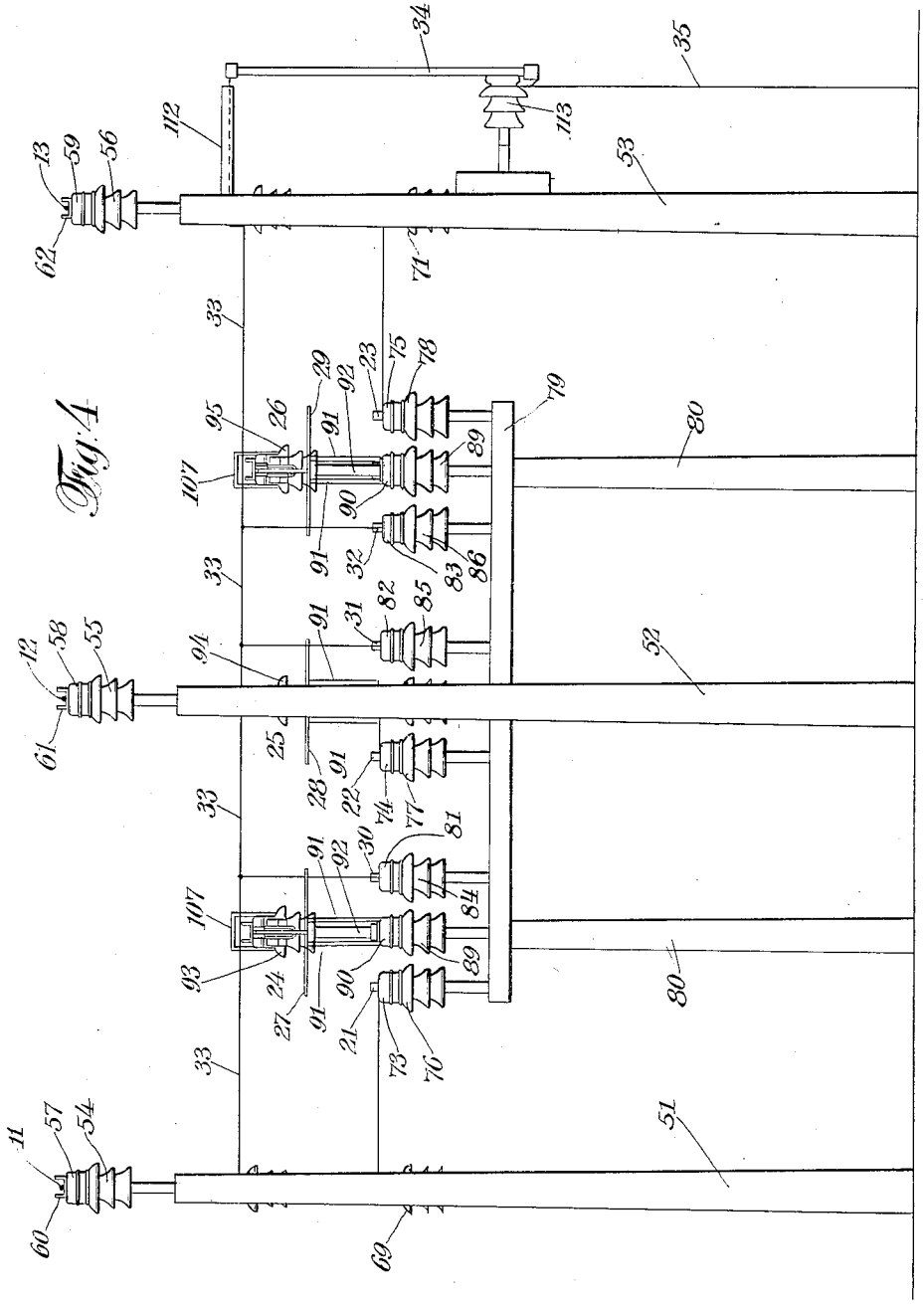

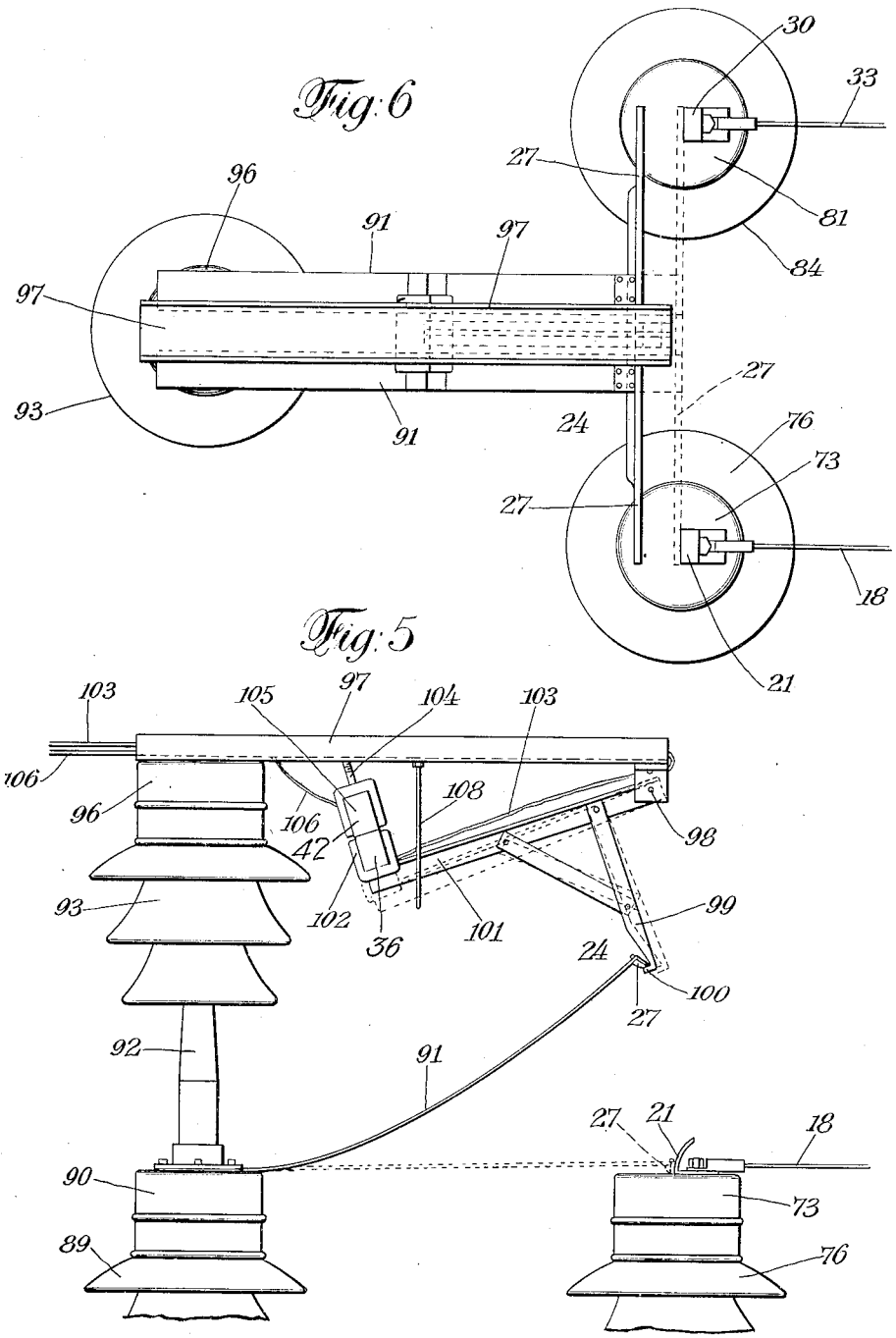

UNITED STATES PATENT OFFICE.

LLOYD C. NICHOLSON, OF BUFFALO, NEW YORK.

PROTECTIVE SYSTEM FOR ELECTRICAL TRANSMISSION-LINES.

1,236,595.  Specification of Letters Patent.  Patented Aug. 14, 1917.

Application filed March 29, 1911. Serial No. 617,634.

*To all whom it may concern:*

Be it known that I, LLOYD C. NICHOLSON, a citizen of the United States, and a resident of Buffalo, county of Erie, State of New York, have invented certain new and useful Improvements in Protective Systems for Electrical Transmission-Lines, of which the following is a specification.

My invention relates to systems for protecting electrical transmission lines, and more especially to systems for extinguishing arcs on high tension alternating current transmission lines.

On high tension lines especially, insulators often flash over, due to a rise in voltage, brought on by lightning or otherwise. This flashover is almost invariably followed by a power arc, which continues until the controlling circuit breaker opens the circuit on which the arc exists. Arcs may also be caused by foreign objects coming temporarily into contact with a wire or wires of the line. In any case, the result is substantially the same; the circuit must be opened before the arc will discontinue. It may be immediately closed again, provided the insulation is not broken down by the effects of the arc. These interruptions, though always fairly short, are highly objectionable from the consumers' standpoint, and with my present arrangement, such temporary disturbances may be done away with without disconnecting the line and the arcs may be put out in such short time after they develop that sensitive, synchronous, rotating, receiving machinery will not fall out of step and require starting up again. In general, I accomplish this result by automatically and substantially instantaneously substituting a metallic short circuit or ground connection in front of (that is, at the power house) the one which exists as an arc out on the line, which metallic short circuit is capable of being quickly disconnected or opened after it is put on. It is apparent that the current which at first circulated through the arcing short circuit ceases to do so as soon as the metallic short comes on and it is necessary for the metallic short to remain on only long enough for the vapors of the arc to become non-conductive, which I find is a very short interval, from $\frac{1}{20}$ to $\frac{1}{6}$ of a second, depending on the amount of current in the arc, etc. The time consumed in clearing a short circuit in this manner by my improved system is not sufficient to throw synchronous machinery out of step or to interfere with the general operation of the line.

One object of my invention is to provide a system or arrangement whereby when such an arc occurs on such a high tension line, the arc will be immediately deprived of current, thus extinguishing the arc. A further object of my invention is to provide such an arrangement, in which immediately after the arc has been deprived of its current and extinguished and the line has been deprived of its current, the supply of current to the line will again immediately take place from the supply station. A further object of my invention is to provide an especially advantageous arrangement of devices for carrying out the above, which devices are properly insulated so as to be safe. A further object of my invention is to provide such an arrangement of devices that they are simple and easy of construction and economical and efficient in operation. Further objects, features and advantages will more clearly appear from the detailed description given below, taken in connection with the accompanying drawings, which form a part of this specification.

Referring to the drawings, Figure 1 is a diagram showing the general arrangement of the main features of a system embodying my improvements in one form. Fig. 2 is a vertical view showing parts of my improved system, some of the parts being shown diagrammatically. Fig. 3 is a plan view of the parts shown in Fig. 2. Fig. 4 is a vertical view of the parts shown in Fig. 2, but taken at right angles to Fig. 2. Fig. 5 is a detailed vertical view of one of the switches and coöperating parts shown in Figs. 1, 2 and 4, inclusive. Fig. 6 is a plan view of the parts shown in Fig. 5. Fig. 7 is a diagram illustrating a somewhat modified form of system. Figs. 8 and 9 are detailed vertical views of the electro-magnetic devices shown in Fig. 5.

Referring to Fig. 1, 1 represents the sending station of the high potential end of a transformer feeding high potential buses 2, 2, 2 at the sending station. The neutral of the sending station at 1 is connected to ground at 3, as through a resistance 4. The buses 2, 2, 2 feed two sets of 3-phase high potential line wires 5, 6, 7 and 8, 9, 10. From each of the buses 2, 2, 2 or their corresponding line wires are connections 11, 12 and 13, which lead to inclosed fuses 15, 16 and 17. From the inclosed fuses 15, 16 and 17, connections 18, 19 and 20 lead to contacts 21, 22 and 23 of switches 24, 25 and 26. Switches 24, 25 and 26 are provided with connecting switching members 27, 28 and 29, which are adapted to connect the contacts 21, 22 and 23 of the switches with the contacts 30, 31 and 32 of the switches. A common connection 33 connects the various contacts 30, 31 and 32 together, and also with inclosed fuse 34. The inclosed fuse 34 is connected to ground by means of a conductor or connection 35.

For controlling the operation of the switches 24, 25 and 26, there are provided relay electro-magnet coils 36, 37 and 38, supplied with energy from the secondaries 39, 40 and 41, of transformers in series with the line wires of the polyphase transmission line. Also aiding in the control of the switches 24, 25 and 26 are electro-magnet coils 42, 43 and 44, continuously supplied with energy as by a battery 45.

The general operation of my system as thus far described is as follows: Assume that a ground on the line wire 5 has occurred as at 46. Such a ground may be due to several causes, such as lightning, causing the flashing over of an insulator, and in other ways. The ground having once started, the arc continues from the line wire 5 to ground, due to the flow of the power current. This action causes an abnormal flow of current through the line wire 5 from the sending station or transformer, which current produces an abnormal current in the secondary 41 of the series transformer which, in turn, operates upon the switch 26 and causes the switching member 29 to electrically connect the contacts 23 and 32, so that the line wire 5 at the sending station is connected directly to ground as through the connection 13, 17, 20, 23, 29, 32, 33, 34 and 35. This connection shunts the arc at 46, depriving it of power current and causing the power current to pass back to the sending transformer through ground connection 3 and the resistance 4. Immediately the arc 46 has been deprived of its current it ceases, and it then remains for means to act, whereby the sending station of transformer will again furnish current to the line wire 5. This is accomplished by means of the fuse at 34. Just as soon as the current has been shunted from the arc 46 to extinguish the same, this heavy current passing through the ground connections 13, 17, etc., 34 and 35, causes the fuse at 34 to burn out, thus opening this ground connection so that the condition of the system is substantially the same as before the arc at 46 took place.

The fuse 17 is designed to carry a much heavier current than the fuse 34, but if the current is large enough the fuse 17 may also burn out, but since in many systems such ground currents are not large the fuse 34 is designed to burn out on the passage of a relatively small current therethrough, but in either case normal conditions are again restored and the sending station at 1 will again furnish the proper service current to the line wire 5, as well as to the other line wires of the polyphase systems. The above operations take place so quickly that practically immediately the arc at 46 has formed, the current is shunted away therefrom, so that the arc is immediately extinguished and immediately the arc is extinguished the fuse at 34 opens the shunt circuit so that the system again resumes its normal operation. These operations take place so quickly that service upon the line is not interfered with. Thus, my improvements do away with temporary interruptions, which are highly objectionable from the consumers' standpoint without disconnecting the line, and extinguish the arcs in such short time after they develop that sensitive, synchronous, rotating, receiving machinery will not fall out of step and require starting up again. The whole operation is carried out automatically and substantially instantaneously.

In a similar manner, an arc occurring between any of the other transmission wires and ground will be extinguished in a like manner, the switch corresponding to the particular line wire on which the arc occurs, operating to form a ground connection and shunt the arc to extinguish it. The fuse 34, being directly at the station, is replaced after it has been burned out, so that it is ready for another operation.

Now, assume that an arc or short circuit occurs as at 47, between two line wires 9 and 10. In this case the current passing from the sending station through each of the line wires 9 and 10 will become abnormal, thus increasing the current in the secondaries 39 and 40 of the series transformers, causing the operation of their corresponding switches 24 and 25. This will connect both of the line wires 9 and 10 to ground, but since the arc is not to ground and the resistance 4 is in series with the ground circuit, the bulk of the current will not pass through the ground circuit back to the sending station, but, on the contrary, will pass through the short circuit between the line wires 9 and 10, through the connections 12, 16, 19, 22, 28, 31, 33, 30, 27, 21, 18, 15 and 11. These connections form a shunt circuit directly around the arc 47 and short circuit the same, taking away its current so that the arc at 47 immediately ceases. Substantially as soon as this is accomplished, one of the fuses 15 or 16, or both of them, burns out, thus destroying the shunt connection around the arc 47 and restoring the line to its normal operation. As described above in connection with the arc 46, the extinguishing of the arc 47 takes place so quickly and the burning out of the fuse 15 or 16 follows so quickly that there is not any substantial interruption of the service on the line and sufficient time does not elapse to throw receiving synchronous machinery out of step.

In a similar manner, a short circuit between any other two line wires will be opened and the line restored to normal operation in a similar manner, in which case the switches corresponding to the particular line wires involved will operate. The inclosed fuses 15, 16 and 17, being at the sending station, may be easily replaced for further operation after they have once blown out, the switches being reset before new fuses are put in.

Referring to Figs. 2 to 6 inclusive, I will describe further details of a system embodying the improvements shown in Fig. 1. Poles 51, 52, and 53 carry at their tops high potential insulators 54, 55 and 56. These insulators carry iron caps 57, 58 and 59 on their tops and secured to these iron caps are iron troughs 60, 61 and 62. The wires or connections 11, 12 and 13 are arranged to lie horizontally within these iron troughs 60, 61 and 62. After leaving the iron troughs 60, 61 and 62, the wires 11 connect with the inclosed fuses 15, 16 and 17, and the inclosed fuses 15, 16 and 17 are electrically connected with the wires 18, 19 and 20 which lie in iron troughs 63, 64 and 65 secured to iron caps 66, 67 and 68 secured on top to high potential insulators 69, 70 and 71, carried on poles 72. From the iron troughs 63, 64 and 65 the connections 18, 19 and 20 lead to the contacts 21, 22 and 23, respectively, of the switches 24, 25 and 26. The contacts 21, 22 and 23 are secured to iron caps 73, 74 and 75 carried by high potential insulators 76, 77 and 78, supported upon a cross-tree 79 by poles 80.

The contacts 30, 31 and 32 of the switches above described are carried upon iron caps 81, 82 and 83, carried by high potential insulators 84, 85 and 86, respectively, which insulators are also supported by the cross-tree 79.

Carried by poles 87, is a cross-tree 88, which carries three high potential insulators 89 thereon. Each of the high potential insulators 89 has an iron cap 90, carried on its top, to each of which is secured two parallel flat springs 91. (See more particularly Figs. 5 and 6). The flat springs 91, carry at their outer ends the switching members 27, 28 and 29, respectively. Also supported and carried by the cap plates 90 are three posts 92, which carry on their tops high potential insulators 93, 94 and 95. The high potential insulators 93, 94 and 95 carry upon their tops iron cap plates 96, which carry horizontal iron troughs 97. At the outer ends of each of the iron troughs 97 there is pivoted as at 98 a latch 99, which has a finger 100 adapted to engage under the switching members 27, 28 and 29 to hold the same up and spaced away from their respective contacts of the switches. (See Figs. 5 and 6). Each latch 99 carries an arm 101, rigidly fixed therewith, which arm 101 carries at its lower end an electro-magnet 102. The electro-magnets 102 carry the coils 36, 37 and 38 and are supplied with alternating current from the series transformers 39, 40, 41, respectively, by means of leads 103. (See Fig. 1.) Secured to the iron troughs by means of bolts 104, and arranged to co-act with the magnets 102 are electro-magnets 105, which carry the coils 42, 43 and 44 which are fed from the battery 45, by means of leads 106. The magnets 102 and 105 and their coöperating parts may be covered by means of boxes 107, to protect these parts from the weather. In order to limit the swinging movement of the latch 99 when it is released by the magnets 102 and 105, a U-bolt 108 is provided which passes under the arm 101 and engages the same when it drops downwardly to unlock the switching members 27, etc.

It will therefore be seen that upon the occurrence of the predetermined heavy currents in either of the secondaries 39, 40 or 41 of the series transformers, this alternating current flowing through its magnet 105 will decrease the attractive force, tending to hold the magnets 102 and 105 together so as to release the arm 101, allowing it to drop downwardly under its own weight. This moves the latch 99 and its finger downwardly, thus releasing the corresponding switch member 27 or 28 or 29 so that it is mechanically forced quickly downwardly to connect the corresponding contacts of the switch. The details of the magnets 102 and 105 are more clearly shown in Figs. 8 and 9.

For completing the ground connections from the contacts 30, 31 and 32, these contacts are connected to the connection 33, supported between iron caps 109, carried on top of high potential insulators 110, which are, in turn, supported by poles 111. One of the caps 109 carries an iron trough 112, through which the connection 33 passes to the inclosed fuse 34 above described. The inclosed fuse 34 is also held in place by means of high potential insulator 113, carried upon one of the poles 111. From the inclosed fuse 34, the connection passes to ground through wire 35.

All of the high potential insulators above described should be designed to withstand the high tension voltage of the system employed. These insulators should be capable of withstanding about 10,000 volts or more. It will therefore appear that the contacts 21 and 30, 22 and 31, and 32 and 23 are each insulated from one another sufficiently to withstand about 10,000 volts or more and also their corresponding switch members 27, 28 and 29 are normally kept at such a distance from these contacts that they are insulated from them sufficiently to withstand about 10,000 volts or more.

From the above it will appear that by my improved system and the particular arrangement of the switching members I am enabled to use the apparatus on extremely high voltage transmission lines and by causing the switching members 27, 28 and 29 to be thrown against their contacts by mechanical force, as by the springs 91, I am enabled very quickly to close the switch, at the same time normally maintaining the switching members sufficiently distant from their contacts properly to insulate the same. My improved arrangement is therefore capable of utilizing a very long stroke so as to obtain a large air space for insulating purposes in order that the arrangement may be used on high voltages. The cutting-in switching device is capable of extremely quick action, which is very important. Primarily so that the entire event may consume the shortest possible time to prevent heavily loaded synchronous machinery at the end of the lines falling out of step, which machinery falls out of step if the short circuit or ground continues for even a small part of a second. My electro-magnetic release in combination with a strong spring makes the apparatus capable of very swift motion and operation. There is absolutely no lagging action, for the very moment the current exceeds a certain amount which in practice corresponds to the exact alternation or half cycle in which the short circuit or ground occurs on the line, the spring switch is released and the switches are thrown in. Moreover, far quicker action may be obtained by using the fuses than other forms of switches, since the inertia of heavy moving parts of a switch member prevents quick action. A fuse, on the other hand, burns out in any period of time desired, this being regulated entirely by the size of the fuse employed on a generating plant of a given capacity. The fuses are further advantageous for their reliability.

It will further be seen from the above that I have provided a selective action, whereby only the line grounded or short circuited, will be operated upon. On polyphase transmission systems, controllable short circuits should be placed on the lines, which are short circuited or grounded and on those only, for if only two lines are shorter, the third continues in combination with the two short circuited ones to supply single phase power to the rotating receiving machinery, which action tends to hold the receiving machinery in step and prevents it stopping. In other words, it is easier to suffer a single phase short than a three-phase short, and for this reason it is important that the automatic devices should affect only the line wires in trouble and should not attempt to cure a single phase short by means of a three-phase short.

In the case of a large concentrated load of synchronous machinery at the receiving station, it might be advisable to have a similar system arranged at the receiving end also. Also the same may be said in case there is more than one source of power feeding into the same transmission system. The system would be connected up exactly as shown in the drawing, except instead of being connected at the sending station or transformer 1, it would be correspondingly connected at the receiving station or other sending station, as will be obvious to those skilled in the art. The automatic fuses at the receiving end would have the same time period as those of the power house, and the time during which the power house fuses are burning out would coincide with the time in which the receiving station fuses were burning out, so that the arc on the line would be robbed of current from both sources simultaneously.

As far as I am aware, my improved system is the first which not only cuts out or blows out an arc on the high tension line, but does it quickly enough to save the synchronous load. And also not only does my improved system take care of arcs between the line and ground, but also arcs forming short circuits between two or more conductors. The whole action of extinguishing an arc takes place so quickly in my improved system, that the line conductors are prevented from burning which result, I believe, no other known means will accomplish.

Referring to Fig. 7, I there show a modified form of system, which is not so satisfactory for large stations, but which may be satisfactory to some extent on small sized systems. As there shown, the sending station 120 has its neutral connected to ground through a resistance 121. Two sets of three-phase lines 122, 123, 124 and 125, 126 and 127 are supplied from the station buses 128, 129 and 130, respectively. Connected with the bus 130 or with the line wires 124 and 127 is connection 131, which leads to one terminal 132 of an oil switch 133. The other terminal 134 of the oil switch leads to a connection 135, which is connected to ground and also to the other corresponding terminals of two oil switches which are arranged in the system similar to switches 24, 25 and 26, shown in Fig. 1. Series transformers 136, 137, 138 and 139, 140 and 141 are arranged in series with their respective line wires. Thus, when a short or ground occurs on one of the line wires as at 142 on the line wire 124, the heavy current passing through the series transformer 138 causes a heavy current to flow in its secondary and in the regulating circuit 143, which current operates a relay in any well known manner at 144 to connect contacts 145 and 146, thereby closing a circuit through the battery 147 and coil 148. Coil 148 attracts the armature 149, which pulls up the switch 133, so as to connect the contacts 132 and 134 in order to form the ground or shunting connection for the arc 142. This extinguishes the arc as already described. However, immediately the heavy current flows through the ground connection 131, 132, 133, 134 and 135, the heavy current passing through the series transformer 150 in the ground connection induces a heavy current in the secondary of the series transformer 150 operating a relay, as at 151, of any well known form to electrically connect contacts 152 and 153. This closes a circuit embodying the battery 146 and the coil 154. The coil 154, thus becoming energized, attracts the armature 149 downwardly, thus opening the oil switch in order to return the system to normal operation, as described in connection with Fig. 1.

It will, of course, be understood that there is an oil switch similar to the switch 133 and its operating and coöperating parts for each phase of the system. In other words, there will be a similar oil switch controlled by the two series transformers 136 and 139, which will connect the phase 128 to ground through the connection 160. And also a similar oil switch, controlled by the series transformers 137 and 140 for connecting the bus 129 to ground through the connection 161. The ground connections corresponding with connection 135, of the oil switches may be connected together through a metallic conductor or through the ground, so that upon an arc occurring between two of the line wires, as at 162, the same will be immediately shorted and then the short circuit opened to return the system to its normal operation after the extinguishing of the arc. The oil switch 133, and its contacts 132 and 134, is placed in a suitable container 163, filled with oil, and otherwise constructed and operated in a well known manner.

A great advantage with this kind of system is that it does not require resetting after each operation, since the oil switch 143 automatically resets, as above described. However, this system is under the disadvantage that such an oil switch is not capable of use in certain systems, or, at least, it is more liable to be injured and not likely to stand up well after much usage. However, for certain classes of systems, it may be found most satisfactory.

Although I have described my improvements in great detail, nevertheless, I do not desire to be limited to such details, except as clearly pointed out in the appended claims, since many changes and modifications may well be made without departing from the spirit and scope of my invention in its broadest aspects. However, having fully and clearly described my improvements, what I claim as new and desire to secure by Letters Patent, is:

1. A system for extinguishing arcs occurring on high tension power lines of about 10,000 volts or over, comprising in combination with the power line wire, a switch normally open, a connection from one switch contact to the line wire, a connection from the other switch contact to the ground, means for closing said switch responsive to current changes in said line wire, said switch contacts being normally insulated from one another sufficiently to withstand high tension of about 10,000 volts or over when the switch is open and means for opening one of said connections.

2. A system for extinguishing arcs occurring on high tension lines, comprising alternating current high tension line wires, a normally open switch and its contacts for each line wire, a connection from each line wire to one contact of its switch, a connection from each switch to the ground, means for closing each switch responsive to current changes in its line wire, and means for opening said ground connections when a certain current passes therethrough.

3. A system for extinguishing arcs occurring on high tension lines, comprising in combination with a plurality of alternating current high tension power line wires, a connection from each line wire to the ground, a normally open switch in each connection, means for closing each switch responsive to certain current increases in its line wire, the contacts of each switch being insulated from one another sufficiently to withstand a voltage of about 10,000 volts or more, and means for opening said ground connections upon a certain amount of energy passing therethrough.

4. A system for extinguishing arcs occurring on high tension lines comprising in combination with polyphase line wires, a connection from each line wire to the ground, a normally open switch in each connection, means for closing each switch responsive to certain current increases in its line wire, the contacts of each switch being insulated from one another sufficiently to withstand a voltage of about 10,000 volts or more, and means for opening said ground connections upon a certain amount of energy passing therethrough.

5. A system for extinguishing arcs occurring on high tension power lines of about 10,000 volts or over, comprising in combination with the power line wire, a switch normally open, a connection from one switch contact to the line wire, a connection from the other switch contact to the ground, mechanical means for closing said switch by mechanical force, an electroresponsive device for controlling the action of said mechanical means to close the switch responsive to changes in the current flowing in the said line wire, said switch contacts being normally insulated from one another sufficiently to withstand high tension of about 10,000 volts or over when the switch is open, and means for opening one of said connections.

6. A system for extinguishing arcs occurring on high tension lines comprising in combination with polyphase line wires, a connection from each line wire to the ground, a normally open switch in each connection, mechanical means for closing each switch by mechanical force, an electroresponsive device for each switch for controlling the action of said mechanical means to close its switch responsive to changes in the current flowing in its line wire, the contacts of each switch being insulated from one another sufficiently to withstand a voltage of about 10,000 volts or more, and means for opening said ground connections.

7. A system for extinguishing arcs occurring on high tension lines comprising in combination with polyphase line wires, a connection from each line wire to the ground, a normally open switch in each connection, mechanical means for closing each switch by mechanical force, an electroresponsive device for each switch for controlling the action of said mechanical means to close its switch responsive to changes in the current flowing in its line wire and means for opening said ground connections.

8. A system for extinguishing arcs occurring on transmission lines comprising in combination with polyphase transmission line wires, an electrical connection for each phase line wire for shunting the arc thereon, a normally open switch in each connection, mechanical means for closing each switch by mechanical force, and an electro-responsive device for each switch for controlling the action of its mechanical means, to close the switch responsive to variations in the current flowing in one of the said line wires and means for automatically opening said shunt connection.

9. A system for extinguishing arcs occurring on high tension lines comprising in combination with the transmission line, an electrical connection for shunting the arc, a normally open switch in said connection, mechanical means for closing the switch by mechanical force, and an electro-responsive device for controlling the action of said mechanical means to close the switch, the contacts of said switch being insulated from one another sufficiently to withstand about 10,000 volts or more, and means for automatically opening said shunt connection upon the passage of a predetermined current through said connection.

10. A system for extinguishing arcs on transmission lines comprising in combination with polyphase line wires, a normally open switch for each line wire, a connection from each line wire to its switch and a common connection from each switch to ground, means for opening each of said first mentioned connections upon the passage of a predetermined current therethrough, means for opening said common connection on the passage of a predetermined current therethrough, and means for closing each of said switches upon the occurrence of an arc upon its line wire.

11. A system for extinguishing arcs on high tension lines comprising in combination with polyphase line wires, a normally open switch for each line wire, a connection from each line wire to its switch and a common connection from each switch to ground, means for opening each of said first mentioned connections upon the passage of a predetermined current therethrough, means for opening said common connection on the passage of a predetermined current therethrough, and means for closing each of said switches upon the occurrence of an arc upon its line wire, the contacts of said switches being insulated from one another sufficiently to withstand about 10,000 volts or more.

12. A system for extinguishing arcs on high tension lines comprising in combination with polyphase high tension line wires, a normally open switch for each line wire, a connection from each line wire to its switch and a common connection from each switch to ground, a fuse in each of said first mentioned connections for opening each of said first mentioned connections upon the passage of a predetermined current therethrough, a fuse in said common connection for opening said common connection on the passage of a predetermined current therethrough, and means for closing each of said switches upon the occurrence of an arc upon its line wire.

13. A system for extinguishing arcs occurring on high tension lines comprising in combination with the transmission line, an electrical connection for shunting the arc, a normally open switch in said connection, mechanical means for closing the switch by mechanical force, an electroresponsive device for controlling the action of said mechanical means to close the switch, the contacts of said switch being insulated from one another sufficiently to withstand about 10,000 volts or more, and a single means in combination with said shunt connection and comprising a fuse for automatically opening said shunt connection upon the passage of a predetermined current through said connection.

14. A system for extinguishing arcs occurring on high tension lines comprising in combination with a plurality of alternating current high tension power line wires, a connection from each line wire to ground, a normally open switch in each connection, means for closing each switch responsive to certain current increases in its line wire, the contacts of each switch being insulated from one another sufficiently to withstand a voltage of about 10,000 volts or more, and fuses for opening said ground connections upon a certain amount of energy passing therethrough.

15. A system for extinguishing arcs on transmission lines comprising in combination with polyphase line wires, an electrical connection for shunting an arc occurring between two line wires, normally open switching means for closing said connection, means for operating said switching means to close said connection to shunt the arc to extinguish the arc, responsive to current changes in the system due to the occurrence of the arc, and means for opening said connection responsive to current changes in the connection after the arc has been extinguished.

16. A system for extinguishing arcs on high tension transmission lines comprising in combination with polyphase line wires, an electrical connection for shunting an arc occurring between two line wires, normally open high tension switching means for closing said connection, means for operating said switching means to close said connection to shunt the arc to extinguish the arc, responsive to current changes in the system due to the occurrence of the arc, and a fuse for opening said connection responsive to current changes in the connection after the arc has been extinguished, the contacts of said switching means being insulated from one another sufficiently to withstand about 10,000 volts or over.

17. A system of extinguishing arcs on high tension transmission lines, comprising in combination with polyphase high tension line wires, an electrical connection from each line wire to ground, means for closing any connection responsive to the occurrence of an arc on its line wire, and means whereby the connection is automatically opened after the arc has been extinguished.

18. A system for extinguishing arcs on transmission lines comprising in combination with a plurality of line wires, a switch for each line wire, a connection from each line wire to one contact of its switch, a common connection connecting the other contacts of said switches together, means for closing each switch responsive to current changes due to an arc on its line wire, and means for opening one of said connections responsive to current changes therein after the arc has been extinguished.

19. A system for extinguishing arcs on transmission lines comprising in combination with a plurality of line wires, a switch for each line wire, a connection from each line wire to one contact of its switch, a common connection connecting the other contacts of said switches together, means for closing each switch responsive to current changes due to an arc on its line wire, and means for opening one of said connections responsive to current changes therein after the arc has been extinguished, the contacts of each switch being insulated from one another sufficient to withstand about 10,000 volts or more.

20. A system for extinguishing arcs on transmission lines comprising in combination with a plurality of line wires, a switch for each line wire, a connection from each line wire to one contact of its switch, a common connection connecting the other contacts of said switches together, means for closing each switch responsive to current changes due to an arc on its line wire, a fuse in each connection for opening one of said connections responsive to current changes therein after the arc has been extinguished, the contacts of each switch being insulated from one another sufficient to withstand about 10,000 volts or more, and means for grounding said common connection.

21. A system for extinguishing arcs on transmission lines comprising in combination with line wires, an electrical connection for shunting an arc occurring on the line wires, normally open switching means for closing said connection, an electroresponsive mechanism for operating said switching means to close said connection to shunt the arc to extinguish the arc, responsive to current changes in the system due to the occurrence of the arc and means for opening said connection after the arc has been extinguished, said means operating responsive to current changes in said connection.

22. A system for extinguishing arcs on transmission lines comprising in combination with a plurality of line wires, a switch for each line wire, a connection from each line wire to one contact of its switch, a common connection connecting the other contacts of said switches together, mechanical means for closing each switch with mechanical force, an electroresponsive device for each switch for causing the operation of its mechanical means responsive to current changes due to an arc on its line wire, and means for opening one of said connections responsive to current changes therein after the arc has been extinguished, the contacts of each switch being insulated from one another sufficient to withstand about 10,000 volts or more.

23. A system for extinguishing arcs occurring on high tension lines comprising in combination with polyphase high tension line wires, an electrical connection for each phase line wire for shunting the arc thereon, a normally open switch in each connection, said switch having its two contacts supported upon high tension insulators, the contacts being insulated from one another sufficient to withstand about 10,000 volts or more, a switching member for connecting said contacts, a spring for forcing said switching member to connect said contacts, a latch for said switching member to hold the switch open, an electromagnetic device for releasing said latch to close the switch, and means for opening each connection upon the occurrence of a predetermined current therein and after the arc has been extinguished.

24. A system for extinguishing power arcs on electrical power transmission lines, comprising in combination with the transmission line, means including an electrical connection for shunting the power arc and taking the power current away from it immediately an arc occurs on the line responsive to the occurrence of an arc, and a fuse for breaking said connection automatically to restore the line to normal operation after the power arc has been extinguished.

25. A system for extinguishing power arcs on electrical power transmission lines comprising in combination with polyphase power transmission lines, an electrical connection from each line for shunting the arc occurring thereon, a normally open switch for closing each connection, means for closing said switches responsive to current changes of the system, and fuses for automatically opening said connection after an arc has been shunted and extinguished.

26. A system for extinguishing arcs on polyphase power transmission lines comprising in combination with the polyphase power transmission line wires, a connection for each phase line wire for shunting an arc occurring on that line wire, a switch for each connection for closing the connection to extinguish the arc, an electroresponsive device controlling the operation of each switch and operating responsive to increases of current in its particular phase, and means for automatically opening said connections after they have been closed to restore the lines to normal operation.

27. A system for extinguishing arcs on high tension polyphase transmission lines, comprising, in combination with the polyphase alternating current transmission line wires, an electrical connection from each line wire to ground, a switch for closing each connection to ground, means for operating each switch, and electro-responsive relay apparatus acting responsive to the occurrence of an arc on a line to cause the closing of a ground connection to shunt the arc and extinguish it.

28. A system for extinguishing arcs on high tension polyphase transmission lines, comprising, in combination with the polyphase alternating current transmission line wires, an electrical connection from each line wire to ground, a switch for closing each connection to ground, means for operating each switch, and electro-responsive relay apparatus acting responsive to the occurrence of an arc on a line to cause the closing of a ground connection to shunt the arc and extinguish it, and means for automatically opening the ground connection after the arc has been extinguished.

29. A system for extinguishing arcs occurring on high tension polyphase transmission lines, comprising in combination with the polyphase transmission line wire, switching means and electrical connections for connecting each line wire to ground, and means responsive to the occurrence of an arc on any line wire for causing the connection between it and ground to be closed to shunt the arc and extinguish the same.

30. A system for extinguishing arcs occurring on high tension polyphase transmission lines, comprising in combination with the polyphase transmission line wire, switching means and electrical connections for connecting each line wire to ground, and means responsive to the occurrence of an arc on any line wire for causing the connection between it and ground to be closed to shunt the arc and extinguish the same, and automatically open the connection after the arc has been extinguished to restore the line to normal operation.

31. A system for extinguishing arcs occurring on high tension transmission lines, comprising in combination with the transmission line, an electrical connection for shunting an arc occurring on the transmission line, a normally open switch in said connection, means for operating said switch to close the connection and an electromagnetic relay device for controlling the action of said switch operating means, to cause the switch to close the connection responsive to the occurrence of an arc on the line.

32. A system for extinguishing arcs occurring on high tension transmission lines, comprising in combination with the transmission line, an electrical connection for shunting an arc occurring on the transmission line, a normally open switch in said connection, means for operating said switch to close the connection, the contacts of said switch being insulated from one another sufficiently to withstand about 10,000 volts or more, and an electro-magnetic relay device for controlling the action of said switch operating means, to cause the switch to close the connection responsive to the occurrence of an arc on the line.

33. A system for extinguishing arcs occurring on high tension transmission lines, comprising in combination with the transmission line, an electrical connection for shunting an arc occurring on the transmission line, a normally open switch in said connection, means for operating said switch to close the connection, an electromagnetic relay device for controlling the action of said switch operating means, to cause the switch to close the connection responsive to the occurrence of an arc on the line, and means for automatically opening said connection after the arc has been extinguished.

34. A system for extinguishing arcs occurring on high tension transmission lines, comprising in combination with the transmission line, an electrical connection for shunting an arc occurring on the transmission line, a normally open switch in said connection, means for operating said switch to close the connection and for automatically opening the connection after the arc has been extinguished, and an electromagnetic relay device for controlling the action of said switch operating means, to cause the switch to close the connection responsive to the occurrence of an arc on the line.

35. A system for extinguishing arcs occurring on high tension transmission lines, comprising in combination with the transmission line, an electrical connection for shunting an arc occurring on the transmission line, a normally open switch in said connection, means for operating said switch to close the connection and for automatically opening the connection after the arc has been extinguished, the contacts of said switch being insulated from one another to withstand about 10,000 volts or more, and an electromagnetic relay device for controlling the action of said switch operating means, to cause the switch to close the connection responsive to the occurrence of an arc on the line.

36. A system for extinguishing arcs occurring on high tension transmission lines, comprising in combination with the transmission line, an electrical connection for shunting an arc occurring on the transmission line, a normally open switch in said connection, means for operating said switch to close the connection and for automatically opening the connection after the arc has been extinguished, and an electroresponsive relay device for controlling the action of said switch operating means, to cause the switch to close the connection responsive to the occurrence of an arc on the line.

37. A system for extinguishing arcs on high tension polyphase transmission lines, comprising, in combination with the polyphase alternating current transmission line wires, an electrical connection from each line wire to ground a switch for closing each connection to ground, means for operating each switch, and an electromagnetic relay for each line wire acting responsive to the occurrence of an arc on a line to cause the closing of a ground connection to shunt the arc and extinguish it.

38. A system for extinguishing arcs on high tension polyphase transmission lines, comprising, in combination with the polyphase alternating current transmission line wires, an electrical connection from each line wire to ground a switch for closing each connection to ground, means for operating each switch, an electromagnetic relay for each line wire, acting responsive to the occurrence of an arc on a line to cause the closing of a ground connection to shunt the arc and extinguish it, and means for automatically opening the ground connection after the arc has been extinguished to restore the line to normal operation, the contacts of each switch being normally insulated from one another sufficient to withstand about 10,000 volts or more.

39. A system for extinguishing arcs occurring on high tension lines, comprising alternating current high tension line wires, a normally open switch and its contacts for each line wire, a connection from each line wire to one contact of its switch, a connection from each switch to the ground, means for closing each switch responsive to current changes in its line wire, and means for opening said ground connections.

40. A system for extinguishing arcs occurring on high tension lines comprising in combination with the transmission line, an electrical connection for shunting the arc, a normally open switch in said connection, means for closing the switch upon the occurrence of an arc, the contacts of said switch being insulated from one another sufficiently to withstand about 10,000 volts or more, and a single automatic means in combination with said shunt connection and comprising a fuse for automatically opening said shunt connection upon the passage of a predetermined current through said connection.

In testimony whereof, I have signed my name to this specification, in the presence of two subscribing witnesses.

LLOYD C. NICHOLSON.

Witnesses:
S. PIEH,
H. B. VINCENT.